(12) United States Patent
Ludwig et al.

(10) Patent No.: US 10,404,658 B1
(45) Date of Patent: Sep. 3, 2019

(54) NAMING SERVICES EXTENSIONS TO URLS TO HANDLE INCONSTANT RESOURCES, NON-ADDRESSABLE RESOURCES, AND LARGE NUMBERS OF RESOURCES

(71) Applicant: Xevo Inc., Bellevue, WA (US)

(72) Inventors: John Ludwig, Bellevue, WA (US); Richard Tong, Seattle, WA (US)

(73) Assignee: Xevo Inc., Bellevue, WA (US)

( * ) Notice: Subject to any disclaimer, the term of this patent is extended or adjusted under 35 U.S.C. 154(b) by 480 days.

(21) Appl. No.: 14/730,201

(22) Filed: Jun. 3, 2015

Related U.S. Application Data (60) Provisional application No. 62/007,006, filed on Jun. 3, 2014.

(51) Int. Cl.
*H04L 29/12* (2006.01)
*H04L 29/08* (2006.01)

(52) U.S. Cl.
CPC ............ *H04L 61/30* (2013.01); *H04L 61/609* (2013.01); *H04L 67/02* (2013.01); *H04L 67/12* (2013.01); *H04L 67/303* (2013.01)

(58) Field of Classification Search
CPC ......... H04L 61/30; H04L 67/12; H04L 67/02; H04L 61/15
See application file for complete search history.

(56) References Cited

U.S. PATENT DOCUMENTS

| 6,961,751 | B1* | 11/2005 | Bates | G06F 17/30884 |
| | | | | 707/999.003 |
| 7,085,814 | B1* | 8/2006 | Gandhi | H04L 29/1232 |
| | | | | 709/208 |
| 7,430,583 | B2* | 9/2008 | Bodin | H04L 29/06 |
| | | | | 709/204 |
| 8,561,147 | B2* | 10/2013 | Lee | H04L 12/2818 |
| | | | | 713/153 |
| 2001/0032273 | A1* | 10/2001 | Cheng | H04L 12/2805 |
| | | | | 709/249 |
| 2002/0029256 | A1* | 3/2002 | Zintel | H04L 12/2803 |
| | | | | 709/218 |
| 2002/0078161 | A1* | 6/2002 | Cheng | H04L 12/2803 |
| | | | | 709/208 |
| 2012/0109404 | A1* | 5/2012 | Pandey | H04L 67/12 |
| | | | | 700/299 |
| 2013/0275574 | A1* | 10/2013 | Hugard, IV | H04L 41/12 |
| | | | | 709/224 |
| 2014/0222592 | A1* | 8/2014 | Kreft | G06Q 30/0277 |
| | | | | 705/14.73 |
| 2015/0031398 | A1* | 1/2015 | Rahnama | H04W 4/185 |
| | | | | 455/456.3 |

* cited by examiner

*Primary Examiner* — Joe Chacko (57) ABSTRACT

A system includes an analytical router including an I/O interface to a plurality of external devices or sensors; logic to identify a device id and a time or location for measurements or feeds received from the plurality of external devices or sensors; logic to apply the device id to associate the measurements or feeds with a device id grouping of the measurements or feeds; logic to apply the time or location, or both, to associate the measurements or feeds with a temporal or geo grouping of the measurements or feeds; and a web page generator to generate a web page comprising one or more links pointing to the measurements or feeds for at least one of the temporal or geo grouping of the measurements or feeds and the device id grouping of the measurements or feeds.

6 Claims, 7 Drawing Sheets

FIG. 7 ns to URLs
NAMING SERVICES EXTENSIONS TO URLS TO HANDLE INCONSTANT RESOURCES, NON-ADDRESSABLE RESOURCES, AND LARGE NUMBERS OF RESOURCES

CROSS-REFERENCE TO RELATED APPLICATIONS

This application claims priority and benefit under 35 U.S.C. 119 to U.S. application Ser. No. 62/007,006, filed on Jun. 3, 2014, which is incorporated herein by reference in its entirety.

BACKGROUND

URLs (Uniform Resource Locators) provide a unique and friendly name by which resources on machines (or virtual machines) may be accessed on the Internet. However URLs have limitations that make them less suitable for the growing body of different devices and content becoming available now via networks and the Internet. Some network resources are "unstable content"; they do not naturally persist over time or on a consistent stable set of machines. One example of such content is video taken at a location at a certain time by moving sensors that are no longer at that location; another example is a web cam that is not always turned on. A temperature reading at a certain location taken using mobile sensors is another example of unstable content. Some content may be captured or stored by devices that are not accessible via IP (Internet Protocol) signaling, or they may not be connected to a network at all, and are thus not addressable by URLs. Examples of devices that may not work well with existing URL addressing are sensor packages based on Arduinos or other non-IP network technologies, passive objects with RFID tags, and objects sensed via camera or other sensor, including people.

URLs are also difficult to assign and administer in large numbers. URLs are assigned by explicit human action; someone reserves a friendly name, and then registers the name/address mapping with a DNS (Domain Name Service). As networks expand to cover billions of nodes, this has several shortcomings. One shortcoming is that the URL approach cannot scale as users amass hundreds and thousands of machines in their lives. Consider the new IP (Internet Protocol)-addressable light bulbs. Will users have to come up with unique names for every light bulb in their house? Every electrical socket? Furthermore, the lack of regularity or structure in the assigned names makes it difficult to navigate across the Internet. For instance, what are the URLs for the cameras in the heart of every major American city? Existing schemes for accessing/managing content on the Internet include load balancing, which splits incoming traffic for an IP address across multiple machines. Load balancing typically assumes machines owned by a single provider. This solution virtualizes a resource across multiple IP addresses, but does not address devices that are no longer present at the network address. Another existing Internet scheme involves map products (e.g., Google Maps), which associate data with a specific location, and which again typically assumes machines and content owned by a single provider. There is also an existing technique called URNs, which is an addressing scheme for non-IP objects. This technique is largely ignored, and doesn't provide same programming model for these resources as for internet resources. Non-IP resources cannot be addressed using HTTP GETs and PUTs for instance.

Yet another approach is persistent cloud storage of files by devices. Today a device can store collected sensor information on some cloud service, for example Dropbox, a custom service on AWS (Amazon Web Services), an Internet of Things service such as iDigi, or ThingSpeak. This results however in a large number of URLs to use to access the data, one for each device, and one for the cloud storage for each device. Conventional URLs are assigned by explicit human action, in which someone reserves a friendly name, and then registers the name/address mapping with a DNS. As networks expand to cover billions of nodes, this approach has several shortcomings. Past friendly name approaches like RealNames proposed to provide extensions to URL naming but required changes to DNS services or URL handling in apps and browsers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Embodiments of a system are described in which a URL, query, and/or regular expression is resolved to a resource (e.g., a web page of links) that is in fact a virtualized aggregation of physical devices, and data collected from those devices over time. The devices may not in fact be online (turned on or network-addressable). For example, the URL http://service/lat-long/temperature may be resolved to an intermediate resource on a network-available device, where the intermediate resource aggregates data collected over time from multiple mobile temperature sensors.

In some embodiments, the system may include an analytical router; logic to identify a device id and a time or location for measurements or feeds received from the group of external devices or sensors; logic to apply the device id to associate the measurements or feeds with a device id grouping of the measurements or feeds; logic to apply the time or location, or both, to associate the measurements or feeds with a temporal or geo grouping of the measurements or feeds; and/or a web page generator to generate a web page. The analytical router may include an I/O interface to a group of external devices or sensors. The web page generator to generate a web page may include one or more links pointing to the measurements or feeds for at least one of the temporal or geo grouping of the measurements or feeds and the device id grouping of the measurements or feeds. Such a system may further include logic to identify identified objects or people represented in the measurements or feeds, logic to apply the identified objects or people to associate the measurements or feeds with an object or person grouping of the measurements or feeds, and/or the web page generator to generate the one or more links pointing to the object or person grouping of the measurements or feeds.

In some embodiments, such a system may further include a parser to extract one or more person or object controls from a client device communication and to identify a set of the object or person grouping of the measurements or feeds that match the person or object controls. Such a system may further include a parser to extract one or more geographic or time controls from a client device communication and to identify a set of the temporal or geo grouping of the measurements or feeds that match the geographic or time controls. Such a system may further include a parser to extract one or more device id controls from a client device communication and to identify a set of the device id grouping of the measurements or feeds that match the device id controls.

In some embodiments, such a system may further include logic to generate an overlap of the temporal or geo grouping of the measurements or feeds and the device id grouping of the measurements or feeds and to generate the web page pointing the one or more links to the overlap.

By way of example a device or sensor (e.g., a camera, microphone, thermometer, . . . ) collects measurements or feeds (e.g., pictures, video, audio, temperature readings . . . ) and communicates the these to a web service and regular intervals, or as available (i.e., event-driven updates). The web service stores the data in a bin (logical storage area) that is specific to the device, that is, the storage area for output from the device is specific to the device. The web service updates user-defined groups that include the device in their membership (association) with pointers (data that identifies, directly or through a chain or indirection, the storage area for the device output). If permissions set on the device will allow it, the web service may update publicly maintained indices for location-based, time-based access to the device content.

Thus, the service persists data for each device. The user can define permissions for all data and also set storage lifetime for data. All the data recorded by the individual devices can then be retrieved at the device-specific web pages, the aforementioned group URLs, or at the persistent search URLs created by the service.

Extended URLs provide access to resources having unpredictable or unreachable availability. Examples of resources that can be addressed by extended URLs are sensor packages or devices connected via non-IP networks such as Zigbee and Z-Wave devices. Additional examples are passive objects with RFID tags, QR codes, or other passive tags, passive objects (e.g., people) sensed via camera or other sensor, a piece of art in a room, and an auto moving down a road.

An system and processes are described to address the shortcomings of conventional URL assignment. Features of the extended mechanism are implemented through re-use of existing URL and DNS services, no modifications are required to the existing services. The mechanism enables uniform, time-invariant access to content that may not reside on a consistent set of machines, or a single machine. Resources may be accessed by simple, standard URL names which may be programmatically engaged by standard internet programming tools. The name may be constant regardless of whether the data is streaming live from a device, or has been stored by a device that is no longer active. The mechanism provides uniform standard access to sensor data. While sensor data (a video or a photo) is often persistent, the techniques to access it often are not. Resources on the Internet may be conventionally assigned an arbitrary name like IMG12340.JPG and stored in a file system, so there is no easy or efficient way to associate the resource with a location without executing deep of (for example) EXIF tag information for large numbers of files.

The mechanisms described herein extend Internet programming models to a set of new scenarios. In the new mechanisms, nodes (devices that will be network-addressable) register with the "cloud" (back end networked machines) and are assigned to users. Each account owner may create their own hierarchy of named sites: for example, 1BC.com/jhludwig/familyroom, 1bc.com/jhludwig/garage, etc. These named sites are configured as groups. Each group has attributes; for example, lifetime, public/private, latitude/longitude, etc. The service then allows searches across the entire database of groups. If for example someone wants to find all "public" groups for a certain latitude/longitude last Wednesday, an appropriate query would be formed. Nodes of the data post content to the "cloud", which persists data for each node. The system provides uniform access to non-computer objects which are observable or sensed by computers on the network. Such objects may now be accessed by simple standard URL names. They may be programmatically utilized by standard Internet programming tools. They provide addressable and programmable access to billions of devices without the requirement for human interaction to register and assign names, and utilizing the existing base of DNS services unaltered.

In one embodiment, a set of computers on the Internet (public cloud) or accessible privately in an intranet (private cloud) maintains a web interface at one or more web addresses. The machines may be at one web address, for example jjjjlabs.com, or multiple web addresses. The machines might be available on each address in a new TLD, for instance the jjjj TLD at serverone.jjjj, servertwo jjjj, etc.

URLS are regularly changed as websites are restructured so that links can (and do) regularly fail. The system maintains virtual links and has a regular structure for those links, so even if the specific data at a URL is not present, an application doesn't get a simple "file not found (404)" error. They may for instance get the nearest geographic connection or the nearest in time for instance. The system allows easy search for many related links as through a regular scheme that makes it easy for applications (and users) to find content without needing to do a general search, with no changes required to the existing base of DNS services.

Users may create accounts on the machine(s), which execute logic (a "service") exposing a public API (using web methods such as GET and PUT) which allows individual devices to register themselves with the service. A device posts initialization information with the service, including a unique ID such as a mac address or other unique hardware identifier. Also communicated to the service is information representing the identity of the person registering the device. This could be a simple name and password pair, or a biometric print or other unique identification information. The service authenticates the identity of the person registering the device, and assigns that device to that person's account. Regardless of whether the user wants to see live or cached data, the user will always go to this persistent web page, and the service will display cached data and live data as it is available.

Each registered device may be assigned a persistent web page hosted in the service with a cache of the device's data, as well as real-time feeds from the device sensors. Each user may group the devices they have in their account into groupings, where each group presents a web interface, organized by account owner name and group name. Examples include jjjjlabs.com/jhludwig/familyroom, jjjjlabs.com/jhludwig/garage, etc. Devices can belong to more than one group. Group membership can be hierarchical, for instance jjjjlabs.com/jhludwig/house, jjjjlabs.com/jhludwig/house/upstairs. Groupings may have lifetimes set by the user. For instance a user may create a grouping for a party which consists of all devices at a party location during the party hours only. Groupings can have geo fences, for instance "this group is for all my devices close to geographic latitude, longitude and altitude".

Groupings (associations) may be rule-based, such as "create a new group for all devices that have thermometers". Groups may have permissions; viewable just by the user, by arbitrary sets of other users, by everyone, etc. If device permissions are set to allow others to see the device, then those other users can include this device in the groups that they create. Groups can be assigned location attributes such as latitude/longitude, street address, or other location attributes. Groups may have other attributes set by the user. Groups can include a user's registered devices, as well as any other device that they may have access to, based on permissions set by other people. Users may create groups through the web interface or they may be created by other processes on the users behalf. All information about the group can be retrieved at the group URL, such as the devices that are in that group, any data these devices have provided, via a web interface, or via an HTTP GET interface for programmatic access. All access is secured by user authentication, and the service provides search across the entire set of devices and groups. An example query might be, "show the information for all groups near this latitude/longitude, last Thursday at noon". The service maintains indices for time, latitude/longitude, and other attributes. Common searches are automatically persisted in a name space so that it is simple to retrieve latitude/longitude data, regardless of device/group involved or time. For instance all latitude/longitude searches might be available with names like jjjjlabs.com/lat-long. This search would provide information provided by all devices at or near that location.

Devices post additional data continually to the service, and the service stores that data for each device and each group which contains it or attributes matching with the device output (location, time, objects, people, etc.). Some devices move and may have variable locations.

Devices communicate sensor readings and feeds such as pictures, video clips, temperature, attitude, proximity, light sensed, etc. Devices may also communicate sensor network readings, which are additional info that the device has become aware of due to local Zigbee, Z-Wave, or other sensor networks. Devices may also communicate perceived objects, which are representations of objects that the device has detected via sensors, or via RFID, Bluetooth, or other local networks. A device may post a list of perceived objects to the service, provided with generic or estimated names and attributes. The user can review the lists of objects on the webpage of the device, and tag or name perceived objects. The user can also indicate tags or names for objects to a device perceiving the objects, using some local input method such as keyboard, voice recognition, or other method.

The service persists data for each device. The user may define permissions for particular data and set storage lifetime for data. All the data recorded by the individual devices may then be retrieved at the device-specific web pages, the aforementioned group URLs, or at the persistent search URLs created by the service. Sensor readings for a group could be retrieved, for instance, at jjjjlabs/jhludwig/bedroom. Historical readings could be retrieved regardless of whether devices are currently live on the network or in that group. Sensor readings could be retrieved at, for example, jjjjlabs/lat-long, again regardless of whether the devices are currently operational.

The mechanisms described herein enable access to sensed information from a device, whether that device is currently network accessible or not. It enables access to information about/from a location, regardless of what devices are present at that location. It enables access to information about non-networked objects and provides uniform machine-generated name access to all devices. No changes are required to existing DNS systems to enable these mechanisms. The system provides uniform access to billions of devices without the requirement for human interaction to register and assign names.

Unlike the traditional URL system, the system allows wild-carding and regular expressions. For instance, the system could return all locations in a house by a simple query jjjjlabs.com/ludwig/*/, which would return all locations. A search for all URLS that involve the living room during the day may be easily expressible as jjjjlabs.com/ludwig/livingroom/10AM. Access to all sensed information from a device, whether that device is currently accessible or not, is under a single name. Access to all information about a location, regardless of what devices are present at that location, is under a single name. Access to information about non-networked objects may be provided under a single name. Access under this single name may be available to end users, as well as standard internet programming tools.

DRAWINGS

Figure 1:
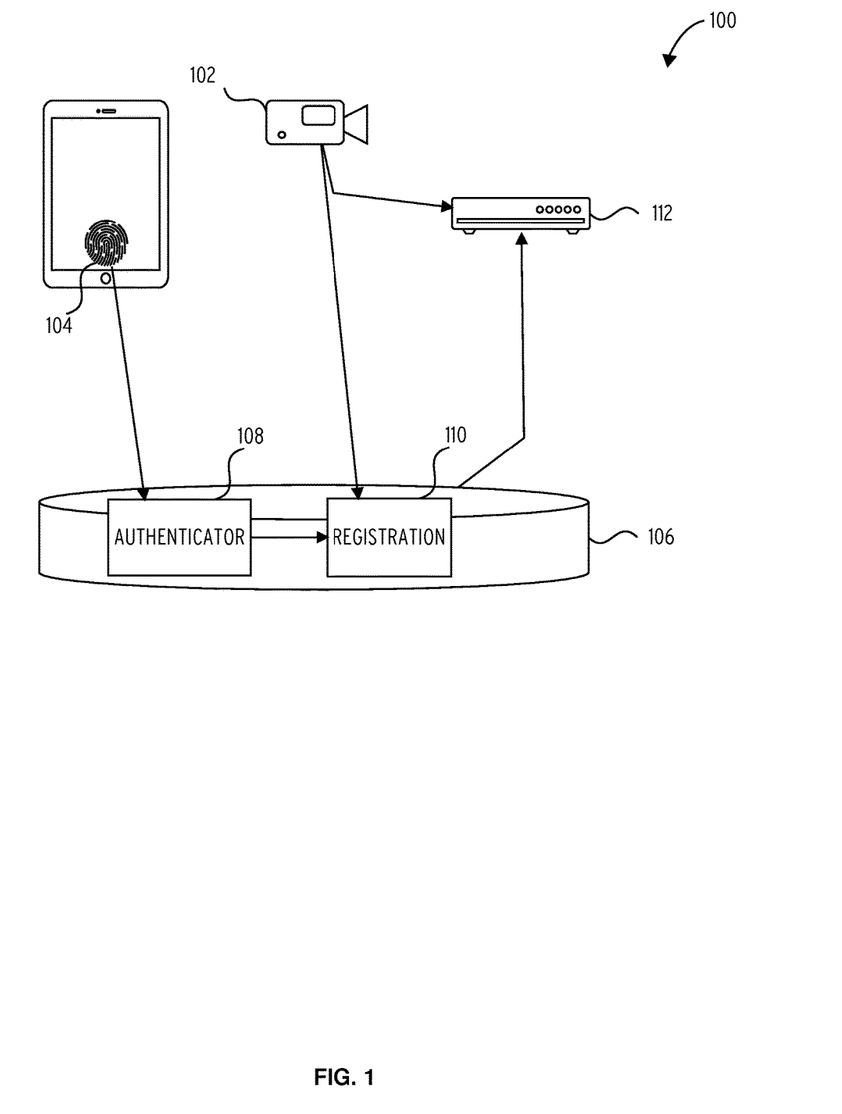
FIG. 1 illustrates a device initialization and configuration system 100 embodiment.

FIG. 1 illustrates a device initialization and configuration system 100 embodiment. The device initialization and configuration system 100 comprises registration and configuration service logic 102 and an analytical router 106, The registration and configuration service logic 102 comprises an authenticator 110 and registration 112 logic. Devices such as a camera 104 register an identity with the registration and configuration service logic 102 and/or the analytical router 106. A user, owner, or manager of the device, e.g. camera 104, authenticates their identity to the authenticator 110 via, for example, a biometric user id 108. The user et. al may then set permissions and other attributes for handling and distributing data from the device, e.g., camera 104.

Figure 2:
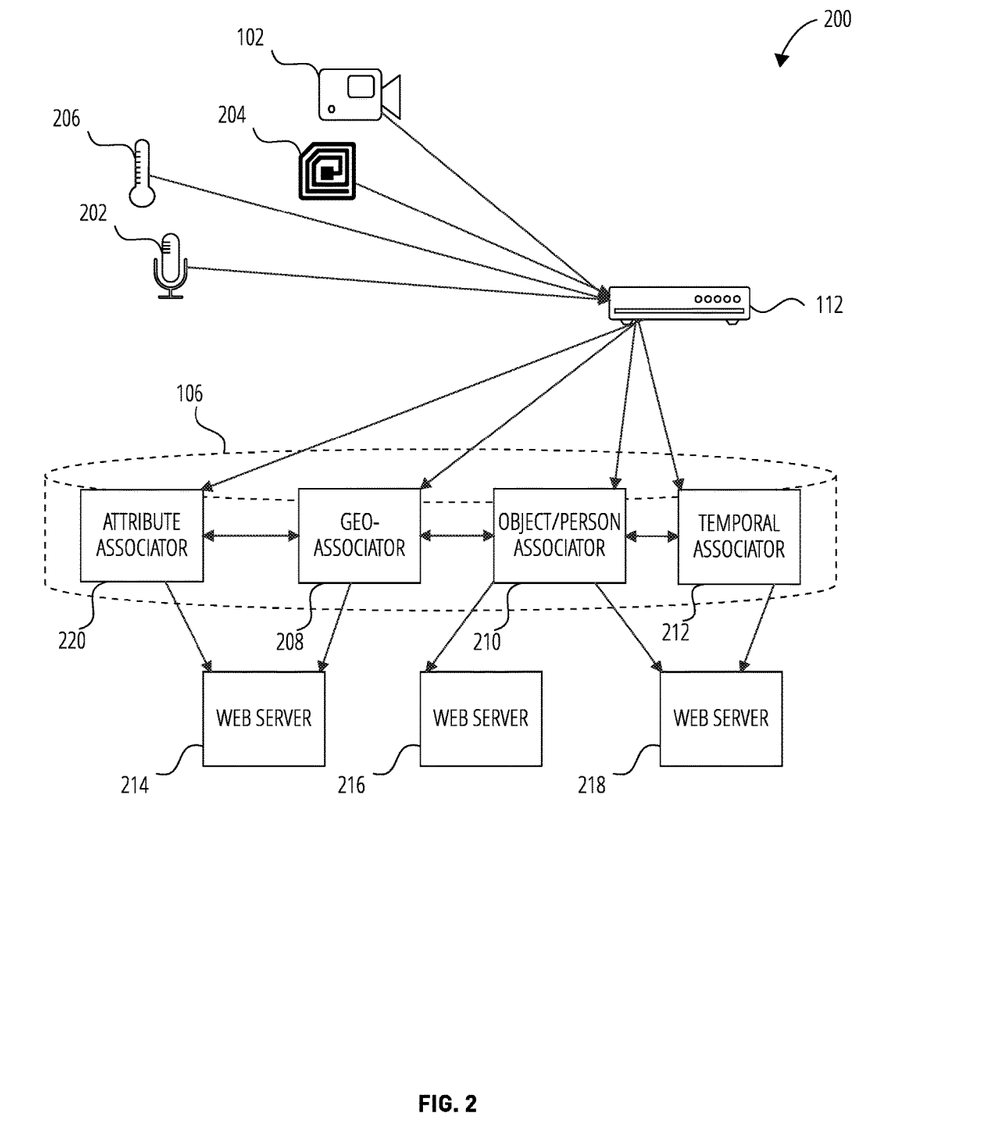
FIG. 2 illustrates an embodiment of a machine system 200 to process device outputs into web pages.

FIG. 2 illustrates an embodiment of a machine system 200 to process device outputs into web pages. Devices providing outputs to the system in this example include a camera 104, an RF Tag 204 (radio frequency tag), a thermometer 206 (temperature sensor), and a microphone 202. Of course other devices could also be involved.

Figure 3:
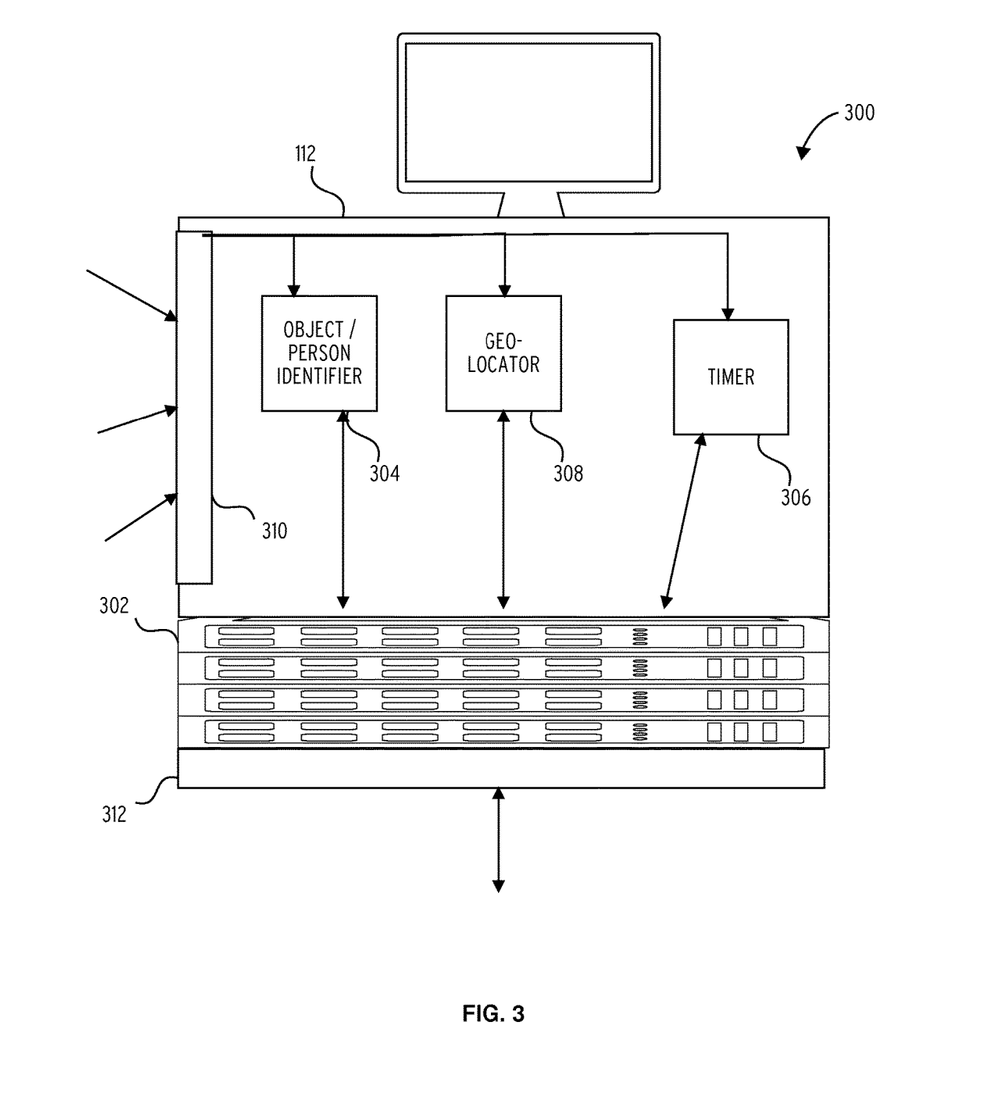
FIG. 3 illustrates a router embodiment 300.

The devices provide outputs in the form of measurements and/or data feeds to the analytical router 106, the operation of which is explained in more detail in FIG. 3. The analytical router 106 routes the device outputs to components of the registration and configuration service logic 102: for each output/feed, one or more of the attribute associator 220, geo-associator 208, object/person associator 210, and temporal associator 212.

The attribute associator 220 determines which, if any, web pages (stored and made available by various web servers) should receive the measurements/feeds from the device, based on attributes of the measurements/feeds. This determination will depend on the configuration settings for different users, groups, and devices, as previously described. In this example three web servers (web server 214, web server 216, and web server 218) are illustrated but of course there could be more or fewer.

The geo-associator 208 determines which, if any, web pages (stored and made available by various web servers) should receive the measurements/feeds from the device, based on locations of the devices providing the measurements/feeds. This determination will depend on the configuration settings for different users, groups, and devices, as previously described.

The object/person associator 210 determines which, if any, web pages (stored and made available by various web servers) should receive the measurements/feeds from the device, based on identified objects or people identified as represented in the measurements/feeds. This determination will depend on the configuration settings for different users, groups, and devices, as previously described.

The temporal associator 212 determines which, if any, web pages (stored and made available by various web servers) should receive the measurements/feeds from the device, based on timing of the measurements/feeds. This determination will depend on the configuration settings for different users, groups, and devices, as previously described.

FIG. 3 illustrates a router embodiment 300. The router embodiment 300 comprises an object/person identifier 304, geo-locator 308, timer 306, routing tables 302, I/O interface 310, and network interface 312. Of course other components not necessary to understanding the invention may also be present.

Measurements (e.g., from sampling devices such as RF Tag 204 and thermometer 206) and/or feeds (e.g., from streaming devices such as camera 104 or microphone 202) are input to the I/O interface 310 and distributed to the object/person identifier 304, the geo-locator 308, and the timer 306. The measurement or feed is analyzed by these components for information to affect the routing tables 302 for the measurements/feeds.

The timer 306 processes the measurements or feeds for timestamp information. If no such information is identified, the timer 306 may timestamp the measurements or feed before directing them to the routing tables 302. The geo-locator 308 processes the measurements for feeds for geo-location markers (e.g., indications of latitude and longitude, addresses, wireless access point or base station ids, etc.) before directing the measurements or feeds to the routing tables 302. The object/person identifier 304 processes the measurements or feeds for identifications of people (e.g., voice or facial recognition, or a biometric), or for object representations or identifications (e.g., a car license plate, an RFID, a distinctive artwork or other object) before directing the measurements or feeds to the routing tables 302.

In each case the object or person id, or the time stamp, or the geo location are routed via the routing tables 302 and from there via the network interface 312 to the registration and configuration service logic 102 along with the measurements or feed.

Figure 4:
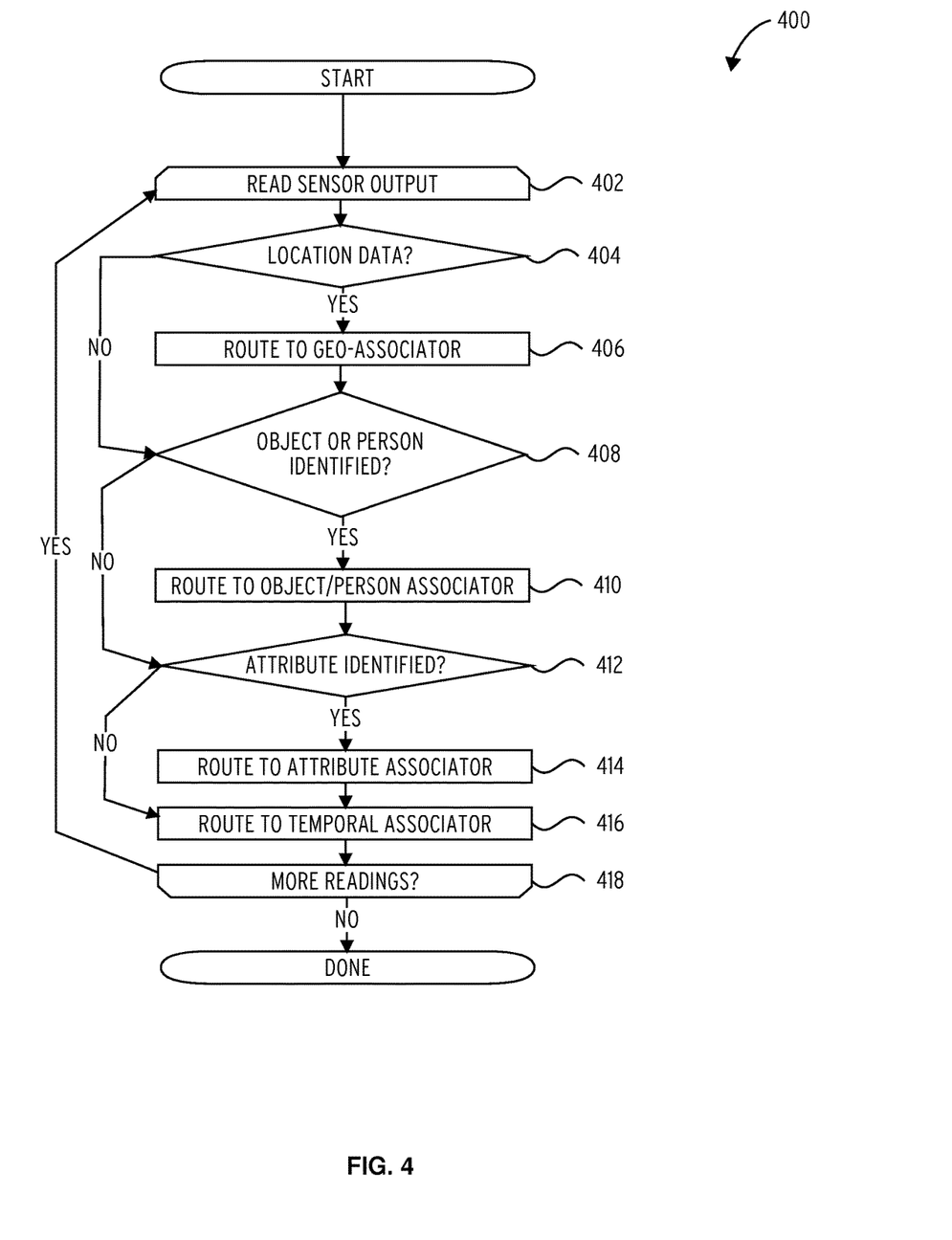
FIG. 4 is a flow chart illustrating an embodiment of a measurement and/or feed routing process 400.

FIG. 4 is a flow chart illustrating an embodiment of a measurement and/or feed routing process 400. Sensor or device measurements or feeds are output at opening loop block 402. If there is location data (decision block 404) in the output it is routed to the geo-associator 208 (block 406). Otherwise the measurement and/or feed is checked for an identifiable object or person (decision block 408). If such is identified, the measurement or feed is routed to the object/person associator 210 (decision block 408). Otherwise it is checked for identifiable attributes (decision block 412). If such is identified, the measurement or feed is routed to the attribute associator 220 (block 414).

There will typically either be a timestamp with the measurement or feed, or one will be added by the timer 306. Thus the measurement or feed may always be routed to the temporal associator 212 (block 416). If there are more readings to process (closing loop block 418), the loop continues, or else the process concludes.

Figure 5:
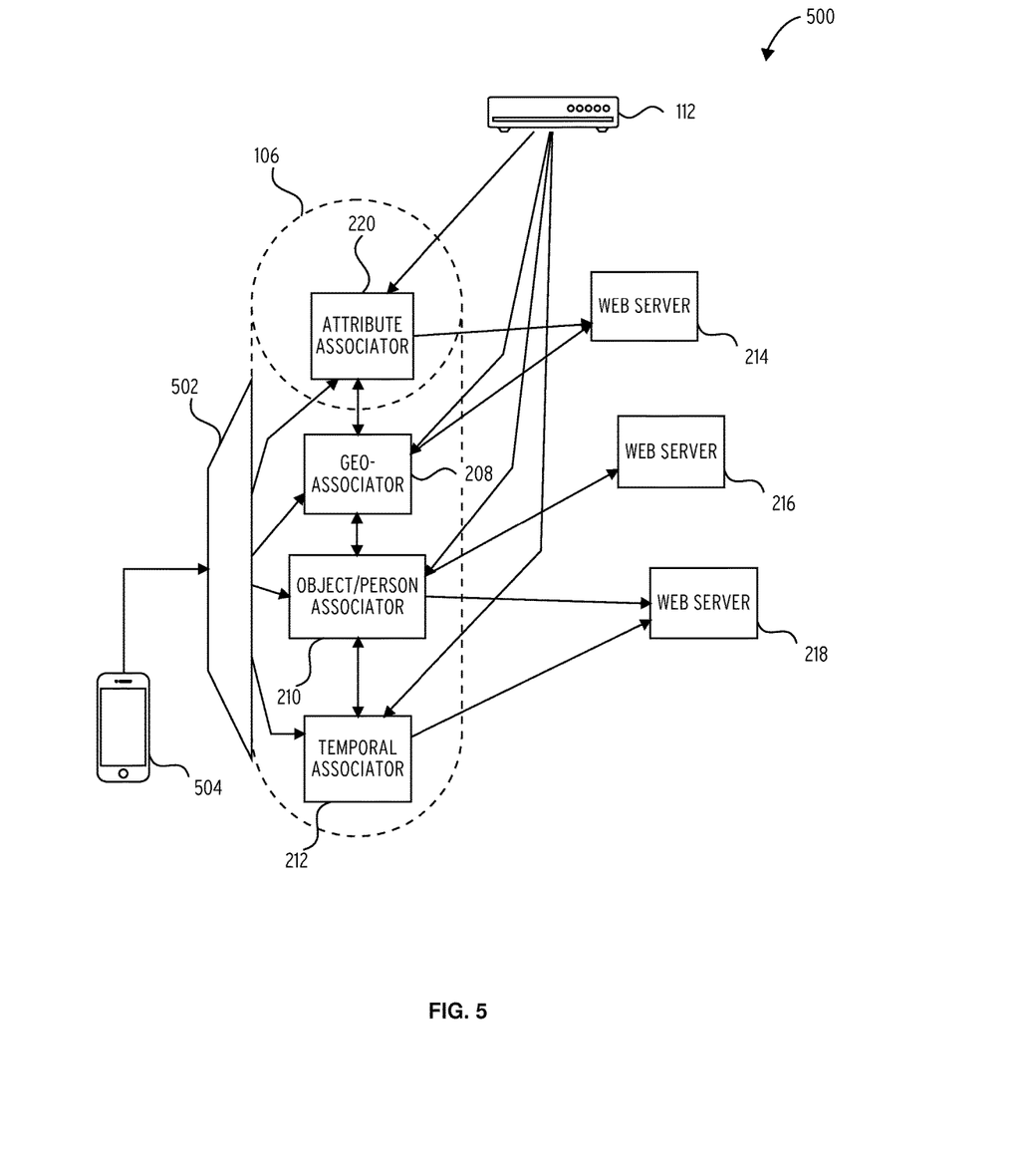
FIG. 5 illustrates an embodiment of a web page generator 500.

FIG. 5 illustrates an embodiment of a web page generator 500. A user query is submitted from a client computing device 502 to a query formulator 504. The query formulator 504 parses the user query (which may take the form of a Uniform Resource Locator or Uniform Resource Identifier) into controls for the various associator components. For example, a logical or physical location identifier may be extracted from the user query; a person's name or object name or description may be extracted; an attribute (e.g., "red cars") may be extracted, and/or a time may be extracted. Each of the extracted information may be provided to the relevant associator to identify relevant feeds or measurements from devices or sensors. One or more web pages may be generated having frames or other content linked to the identified relevant measurements or feeds.

For example, a query such as "show cats at the WestField Stadium within an hour of 10 μm on Saturday" would be parsed for "cats" (a type of object), "WestField Stadium" (which resolves to a geo-location), and "within an hour of 10 μm on Saturday"), which resolves to a time period. These controls are sent to the respective associators for objects, time, and place, and any measurements or feeds that are associated with all three are selected. A link is returned to the client computing device 502 to a web page showing the measurements or feeds (this web page may not exist and may be generated on one or more web server (e.g., web server 214) by the registration and configuration service logic 102 before returning the link to the client computing device 502.

Figure 6:
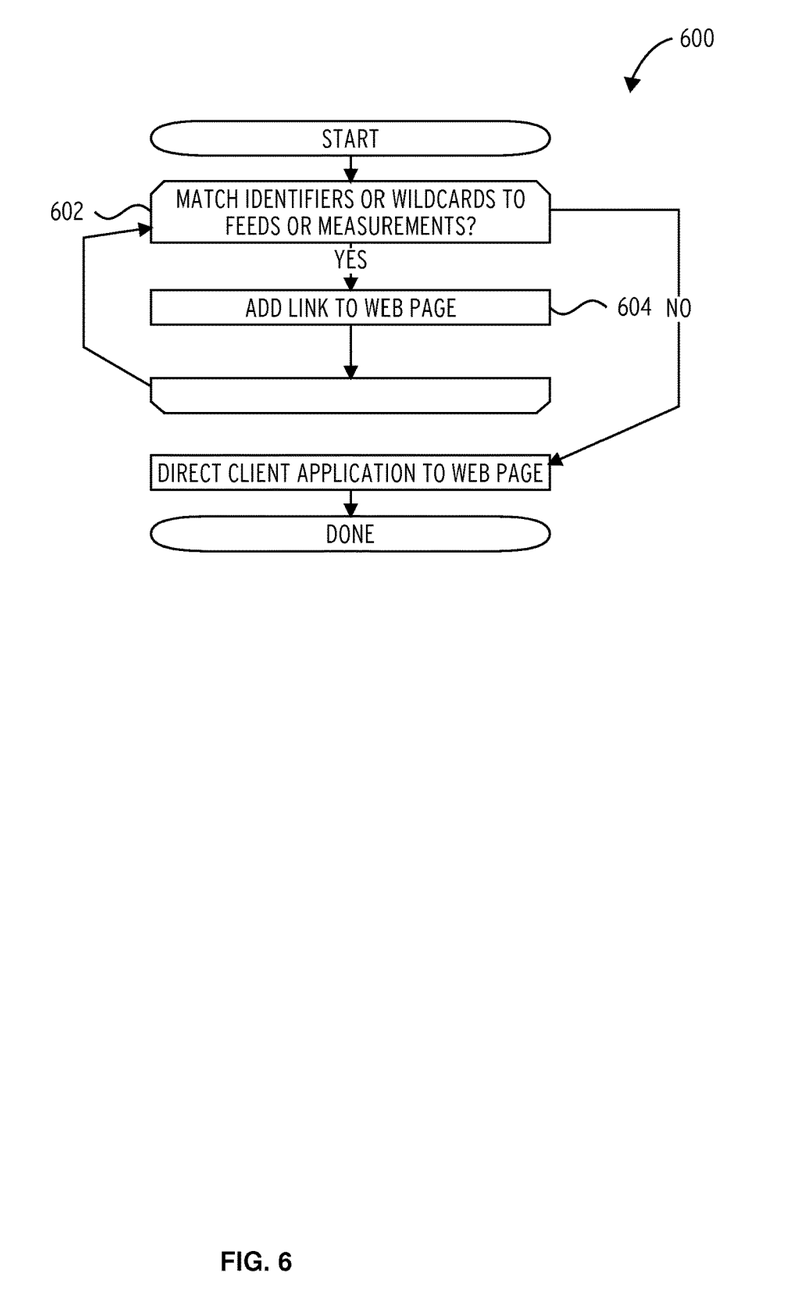
FIG. 6 illustrates a flow chart of an embodiment of a web page generation process 600.

FIG. 6 illustrates a flow chart of an embodiment of a web page generation process 600. Identifiers or wildcards (which could be parts of regular expressions or natural language phrases, or URLs) are matched to feeds or measurements from devices or sensors (opening loop block 604). If there's a match (opening loop block 604), a link to the matched feed(s) is added to a web page, for example by creating and then modifying a file on a web server. This repeats until there are no more matches, at which point the client application submitting the query (e.g., a web browser on a client computing device 502) is directed to the generated web page.

Figure 7:
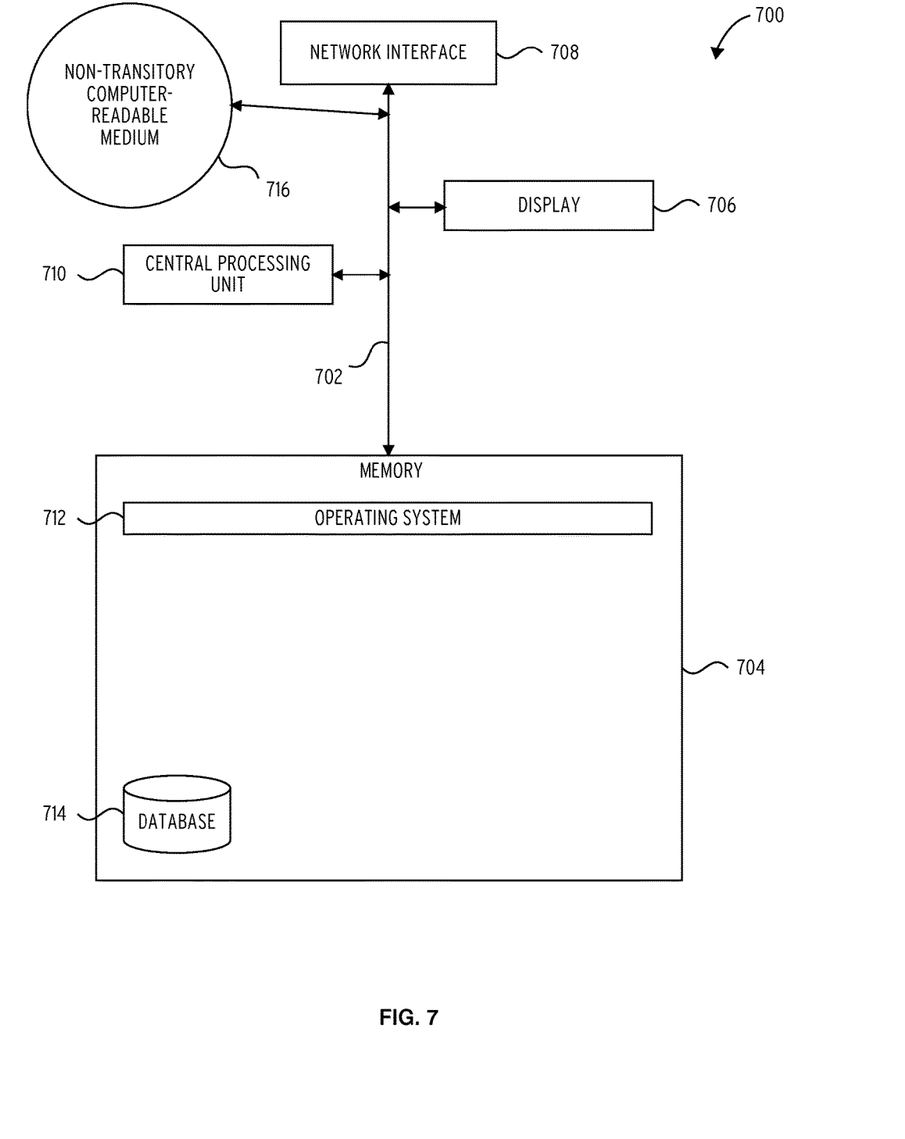
FIG. 7 illustrates a machine system 700 in accordance with one embodiment.

FIG. 7 illustrates several components of an exemplary machine system 700 in accordance with one embodiment. The machine system 700 may in various embodiments implement the analytical router 112, the registration and configuration service logic 106, both of these, or any of the components of these.

In various embodiments, machine system 700 may include a desktop PC, server, workstation, mobile phone, laptop, tablet, set-top box, appliance, or other computing device that is capable of performing operations such as those described herein. In some embodiments, machine system 700 may include many more components than those shown in FIG. 2. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, machine system 700 may comprise one or more physical and/or logical devices that collectively provide the functionalities described herein. In some embodiments, machine system 700 may comprise one or more replicated and/or distributed physical or logical devices.

In some embodiments, machine system 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Machine system 700 includes a bus 702 interconnecting several components including a network interface 708, a display 706, a central processing unit 710, and a memory 704.

Memory 704 generally comprises a random access memory ("RAM") and permanent non-transitory mass storage device, such as a hard disk drive or solid-state drive. Memory 704 stores an operating system 712.

These and other software components may be loaded into memory 704 of machine system 700 using a drive mechanism (not shown) associated with a non-transitory computer-readable medium 716, such as a floppy disc, tape, DVD/CD-ROM drive, memory card, or the like.

Memory 704 also includes database 714. In some embodiments, server 200 (deleted) may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A system comprising:
an analytical router comprising an input/output interface to a plurality of external devices each comprising one or more sensors, wherein the external devices are mobile devices without a fixed location;
logic to associate a device id, a timestamp, and geographic location identifier with each of a plurality of sensor readings received from the external devices, the geographic location identifying a present location of a device providing the readings;
logic to apply the device ids to associate a first subset of the readings with a first device group comprising a subset of the external devices having a common attribute;
logic to apply the timestamps to associate a second subset of the readings, different than the first subset of readings, with a second device group comprising a subset of the external devices providing the readings within a defined time interval, the second device group different than the first device group;
logic to apply the geographic location identifier to associate a third subset of the readings, different than the first subset of the readings and the second subset of the readings, with a geographic region; and
the analytical router comprising routing tables to a plurality of web sites, the routing tables directing the first subset of readings to one or more web site configured to receive readings for the common attribute, the routing tables directing the second subset of readings to one or more website configured to receive readings taken within the time interval, and the routing tables directing the third subset of readings to one or more website configured to receive readings taken from the geographic region.

2. The system of claim 1, further comprising:
logic to identify one or both of objects and people represented in the readings;
logic to apply the objects or the people to associate the readings with an object group or a personal group, respectively, of the readings;
the routing tables directing the readings associated with the object group to one or more web site configured to receive readings associated with objects in the object group; and
the routing tables directing the readings associated with the personal group to one or more web site configured to receive readings associated with people in the personal group.

3. The system of claim 2, further comprising:
a parser to extract one or both of a person control and an object control from a client device communication and to identify a subset of the personal group of readings or the object group of readings that match the person control or the object control, respectively.

4. The system of claim 1, further comprising:
a parser to extract one or both of a geographic control and a time control from a client device communication and to identify subsets of the readings that match the the geographic control and the time control, respectively.

5. The system of claim 1, further comprising:
a parser to extract a device id control from a client device communication and to identify a subset of the readings that match the device id control.

6. The system of claim 1, further comprising:
logic to generate an overlap of the second subset of the readings and the third subset of the readings and to direct the overlap to a web page configured in the routing tables to receive the overlap.

* * * * *